United States Patent
Mather et al.

(10) Patent No.: US 9,599,874 B2
(45) Date of Patent: Mar. 21, 2017

(54) OPTICAL COMPONENT AND DISPLAY

(75) Inventors: Jonathan Mather, Oxford (GB); Nathan James Smith, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 178 days.

(21) Appl. No.: 14/001,914

(22) PCT Filed: Mar. 6, 2012

(86) PCT No.: PCT/JP2012/056216
§ 371 (c)(1),
(2), (4) Date: Aug. 28, 2013

(87) PCT Pub. No.: WO2012/121402
PCT Pub. Date: Sep. 13, 2012

(65) Prior Publication Data
US 2013/0335649 A1  Dec. 19, 2013

(30) Foreign Application Priority Data
Mar. 7, 2011  (GB) .................................. 1103809.8

(51) Int. Cl.
*G02F 1/29*  (2006.01)
*G02F 1/13*  (2006.01)
(Continued)

(52) U.S. Cl.
CPC .......... *G02F 1/29* (2013.01); *G02B 27/2214* (2013.01); *G02F 1/1323* (2013.01);
(Continued)

(58) Field of Classification Search
CPC .............................. G02F 1/29; G02B 27/2214
See application file for complete search history.

(56) References Cited

U.S. PATENT DOCUMENTS 5,737,113 A * 4/1998 Kuramochi ............ G02B 5/203
  359/247
6,069,650 A   5/2000 Battersby
(Continued)

FOREIGN PATENT DOCUMENTS

GB  2 405 542 A   3/2005
GB  2 473 636 A   3/2011
(Continued)

OTHER PUBLICATIONS

International Search Report for corresponding International Application No. PCT/JP2012/056216 mailed Jun. 5, 2012.
(Continued)

*Primary Examiner* — Paisley L Arendt
*Assistant Examiner* — Edmond Lau
(74) *Attorney, Agent, or Firm* — Renner, Otto, Boisselle & Sklar, LLP (57) ABSTRACT

An optical component (1) is switchable between a directional mode and a 2-D mode. The optical component (1) comprising a lens array and an electro-optic layer, for example a liquid crystal layer, disposed in the path of light through the lens array. In the 2-D display mode the lens array has an optical effect on light passing through the component and the electro-optic layer at least partially nullifies the effect. For example the electro-optic layer may, in the 2-D display mode, scatter light or diverge light so as to nullify the focusing effect of the lens array. The optical component (1) may be disposed in the path of light through an image display panel (2) to form a display that may be switched between a directional display mode, eg a 3-D display mode, and a 2-D display mode by suitably switching the optical component (1).

15 Claims, 5 Drawing Sheets (51) Int. Cl.
*G02F 1/1335* (2006.01)
*G02B 27/22* (2006.01)
*H04N 13/04* (2006.01)

(52) U.S. Cl.
CPC ... *G02F 1/133526* (2013.01); *H04N 13/0409* (2013.01); *H04N 13/0452* (2013.01); *G02F 2001/133562* (2013.01)

(56) References Cited

U.S. PATENT DOCUMENTS

| | | | |
|---|---|---|---|
| 6,246,451 | B1 | 6/2001 | Matsumura et al. |
| 6,452,650 | B1* | 9/2002 | Nakao et al. ............ 349/86 |
| 6,714,174 | B2* | 3/2004 | Suyama et al. ............ 345/32 |
| 2003/0063186 | A1 | 4/2003 | Tomono |
| 2004/0164927 | A1* | 8/2004 | Suyama ............ G02B 27/2271 345/32 |
| 2007/0018585 | A1 | 1/2007 | Ijzerman et al. |
| 2007/0296896 | A1* | 12/2007 | Hong et al. ............ 349/122 |
| 2007/0296911 | A1 | 12/2007 | Hong |
| 2008/0013002 | A1 | 1/2008 | Hong et al. |
| 2010/0026920 | A1 | 2/2010 | Kim et al. |
| 2010/0066812 | A1* | 3/2010 | Kajihara et al. ............ 348/46 |
| 2010/0079584 | A1* | 4/2010 | Sung ............ G02B 27/2214 348/52 |

FOREIGN PATENT DOCUMENTS

| | | |
|---|---|---|
| WO | WO 2005/101855 A1 | 10/2005 |
| WO | WO 2010/150166 A1 | 12/2010 |

OTHER PUBLICATIONS

Form PCT/ISA/237 for corresponding International Application No. PCT/JP2012/056216 mailed Jun. 5, 2012.

Yamamoto et al., Optimum Parameters and Viewing Areas of Stereoscopic Full-Color LED Display Using Parallax Barrier, IEICE Trans. Electron., vol. E83-c, No. 10, pp. 1632-1638, Oct. 2000.

Commander et al., "Microlenses immersed in nematic liquid crystal with electrically controllable focal length", EOS Tropical Digest Meetings, Microlens Arrays, vol. 5, pp. 72-76, 1995.

* cited by examiner

OPTICAL COMPONENT AND DISPLAY

TECHNICAL FIELD

This invention relates to multi-view displays such as autostereoscopic displays, multiple view displays such as dual view displays, and directional displays which change their appearance depending on the angle from which they are viewed.

BACKGROUND ART

For many years people have been trying to create better stereoscopic 3D displays, and this invention provides a further advance in this field.

A stereoscopic display gives the illusion of depth in the image by giving each eye a different perspective of a scene, as would happen in reality. The brain then fuses these perspectives together to form a 3D representation of the image in the brain. For example, this may be done by displaying one perspective with one polarization, and the other perspective in a different polarization. A viewer can then see stereoscopic depth by wearing glasses where each eye piece only allows the appropriate polarization to pass.

An auto-stereoscopic display is a display that gives stereoscopic depth without the user needing to wear glasses. It does this by projecting a different image to each eye. These displays can be achieved by using parallax optic technology such as a parallax barrier or lenticular lenses.

These types of displays are well known in the literature. For instance, the design and operation of a parallax barrier for 3D is well described in a paper from the University of Tokushima Japan (Optimum parameters and viewing areas of stereoscopic full colour LED display using parallax barrier, Hirotsugu Yamamoto et al., IEICE trans electron, vol E83-c no 10 October 2000).

Figure 1:
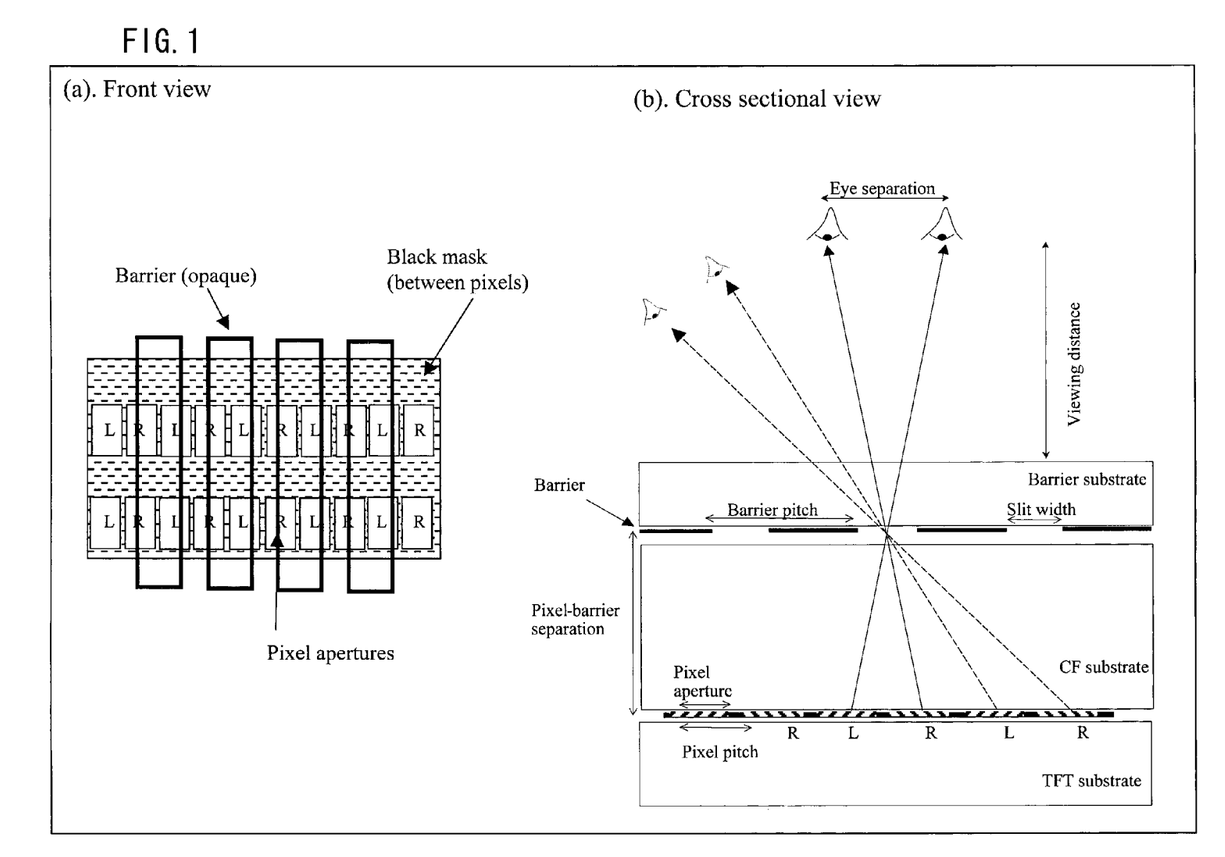
FIGS. 1(a) and 1(b) show the operation of an autostereoscopic display which uses a parallax barrier.

In summary, FIGS. 1(a) and 1(b) show the basics of the parallax barrier operation and design.

They show a cross sectional diagram of an auto-stereoscopic parallax barrier design. The images for the left and right eye are interlaced on alternate columns of pixels, as for previous designs.

The slits in the parallax barrier allow the viewer to see only left image pixels from the position of their left eye, right image pixels from the right eye.

The viewer may look on axis at the display to see a stereoscopic view, but note that they may also see a stereoscopic view off axis as shown in FIG. 1b, the dotted lines. The on axis view is termed the primary viewing window, and the off axis view is called the secondary viewing window.

Figure 2:
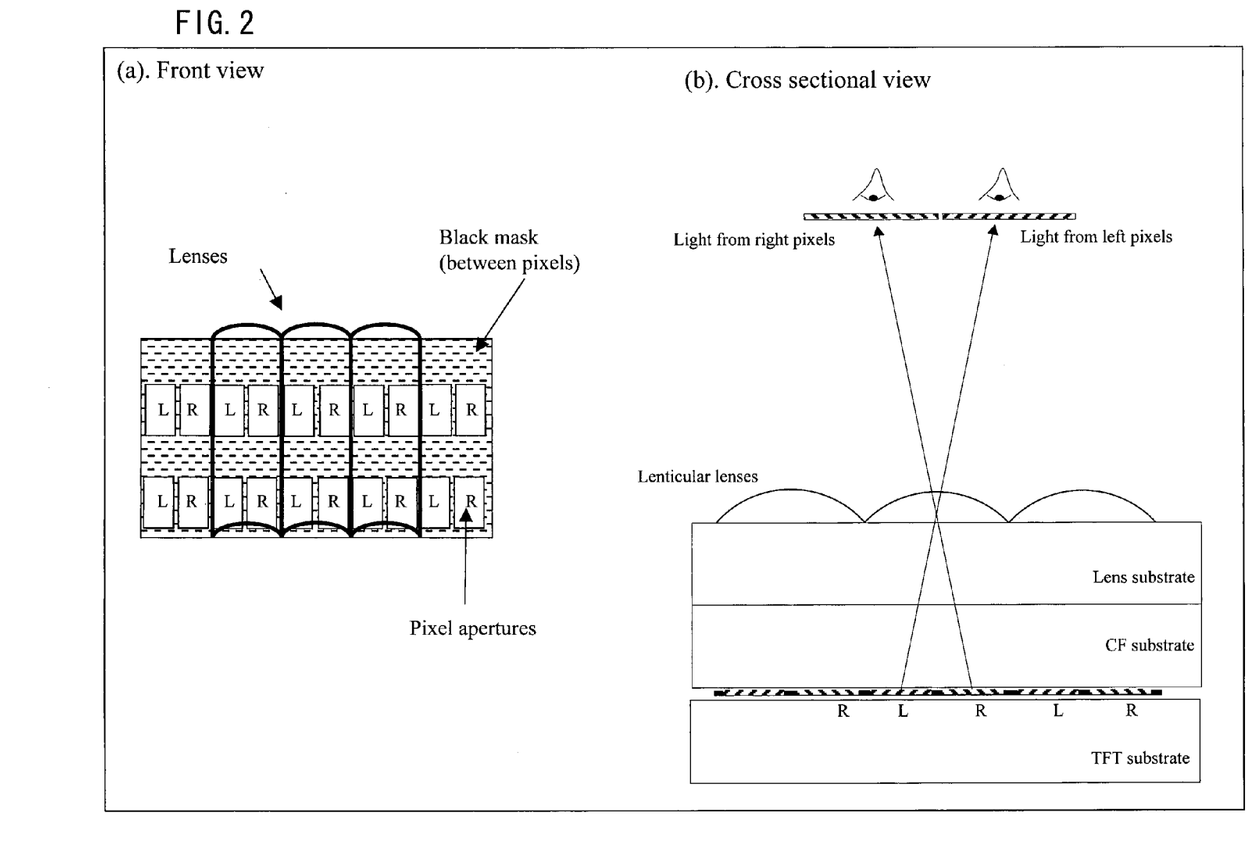
FIGS. 2(a) and 2(b) show the operation of an autostereoscopic display which uses lenticular lenses.

The same 3D effect can be achieved by using lenticular lenses. Each lens is substantially equivalent to a slit on the parallax barrier. FIGS. 2(a) and 2(b) show a conventional 3D system using lenticular lenses.

The lenses image the pixels to the viewer (who is typically 300 mm from the panel). As shown in the diagram, light from the left pixels is directed into the observers left eye, and vice versa. To achieve this the focal length is typically set such that it is about equal to the lens-pixel separation distance, (so that the focal length of the lens is approximately at the plane of the pixels).

The lenticular lenses may also have a light blocking material between the lenses as is known from GB patent application 0320358.5 giving advantages including reduced light leakage between the lenses.

In many cases autostereoscopic 3D displays are needed that can also be switched into regular 2D displays. This can be achieved by using a liquid crystal parallax barrier. The switchable parallax barriers have the disadvantage that they are inefficient in 3D mode (reducing transmission by ~65%). This is a major disadvantage if the display is mostly used as a 3D display such as for a 3D camera. In addition the 3D quality is not optimal.

Switchable microlenses are well known and are described in the paper, Commander et al, EOS Topical Digest Meetings, Microlens Arrays, vol 5 (1995), pp72-76.

Philips invented a system (U.S. Pat. No. 6,069,650) that uses switchable lenses in combination with a liquid crystal display (LCD) to create the 3D effect. These are efficient in both 2D and 3D modes, and use a liquid crystal to either index match or index mismatch lenses embossed in a plastic sheet.

The Philips system has advantages that the 3D mode is more efficient than parallax barrier systems and the 3D quality can be higher. It also has disadvantages that the system is more complicated to manufacture, and it may be very difficult to match the refractive index of the lens structure with the refractive index of the liquid crystal (LC) exactly. This is partly because the index of the LC can vary with wavelength and temperature. Any slight mismatch of the LC and lens structure causes slight residual lensing effect, any residual lensing effect will degrade the uniformity of the 2D mode.

Another Philips system described in WO05101855A1, uses micro-electro-wetting lenses that can be built into a stereoscopic 3D display allowing switching between 2D and 3D modes. The manufacture of these systems is complicated.

Another Philips system described in US2007/0296911A1, uses graded refractive index lenses (GRIN lenses) that can be built into a stereoscopic 3D display allowing switching between 2D and 3D modes. It is difficult to control the refractive index profile of the lens precisely enough to create a high quality 3D mode. This can be especially true of the regions between the lenticular lenses.

WO 2010/150166 and US 2008/0013002 (Philips) propose system using switchable lenses in combination with a liquid crystal display (LCD) that are generally similar to the system of U.S. Pat. No. 6,069,650.

US 2007/0018585 proposes a multiple view display, for example for use in a car. A switchable diffuser (such as a PDLC) is placed between a lenticular array and an electro-optic layer. A multiple view mode may be obtained by controlling the diffuser to be transparent, and a single-view mode may be obtained by switching the diffuser so that it diffuses the light produced by a backlight so that sub pixels are uniformly illuminated.

US 2010/0026920 proposes a component having a liquid crystal layer with an overlaying lens array. A GRIN lens array may be defined in the liquid crystal layer, so that the overall optical effect is given by the sum of the lensing effect of the GRIN lens array in the liquid crystal layer and the lensing effect of the overlying lens array. To obtain a 2-D image, the GRIN lens array in the liquid crystal layer may be arranged to cancel the effect of the overlaying lens array.

U.S. Pat. No. 6,246,451 proposes a lens array 4 with a "light directivity control element" based after the lens array. The light directivity control element has spaced-apart stripes of PDLC provided between substrates. The stripes can be driven to be either transmitting or scattering, whereas regions of the light directivity control element between the PDLC stripes remain transmissive. A 2-D mode, or a directional mode, can be obtained by causing the PDLC regions to be scattering or transmissive respectively US 2003/0063186 proposes defining a lens array in a liquid crystal layer by applying a voltage that varies with the position across the liquid crystal layer, so as to induce refractive index variations across the liquid crystal layer. If no voltage, or a uniform voltage, is applied, the liquid crystal layer has a uniform alignment and a uniform refractive index—so, in the 2D mode there is no lens array.

As such there is no known solution which enables a high quality microlense 2D/3D switchable display that is entirely satisfactory.

SUMMARY OF THE INVENTION

A first aspect of the present invention provides an optical component switchable between a directional mode and a substantially non-directional mode, the optical component comprising a lens array and an electro-optic layer disposed in the path of light through the lens array, wherein the electro-optic layer is disposed over a surface of the lens array and planarises, or substantially planarises, the surface of the lens array; and wherein in the non-directional mode the lens array and the electro-optic layer act such that the optical component has an optical effect on light passing through the component.

The optical component has an optical effect on light passing through the component along its normal axis, and has an optical effect on light passing through the component along directions that are different to the normal axis of the component.

In U.S. Pat. No. 6,069,650, in the non-directional mode the liquid crystal layer has the same refractive index as the plastics sheet in which the lenses are embossed. As a result the plastics sheet and the liquid crystal layer together act as a sheet of uniform thickness and refractive index. The lenses embossed in the plastics sheet has no optical effect on light passing though it, as there is no optical effect (such as refraction) at the interface between the plastics sheet and the liquid crystal layer. In contrast in an aspect of the present invention the component has an optical effect on light passing through it whether the component is in the directional display mode or the non-directional display mode. A non-directional display mode may for example be obtained by arranging for the electro-optic layer to nullify, at least partially, an optical effect caused by the lens array (or another part of the optical component)—where by "nullify" is meant that the electro-optic layer provides an effect that is effective to reverse, or cancel out, an effect produced by the lens array, so that an observer does not perceive the optical effect caused by the lens array. (The electro-optic layer may be positioned before or after the lens array, where a component "after" the lens array is on the same side of the lens array as a viewer and a component "before" the lens array is on the opposite side of the lens array to a viewer.) An aspect of the invention therefore does not require that the electro-optic layer must be capable of being driven to have the same refractive index as the lens array A second aspect of the invention provides a display comprising: an image display panel; and a switchable optical component of the first aspect disposed in a path of light through the image display panel. The switchable optical component is preferably placed after the image display panel, that is between the image display panel and a viewer.

Figure 3:
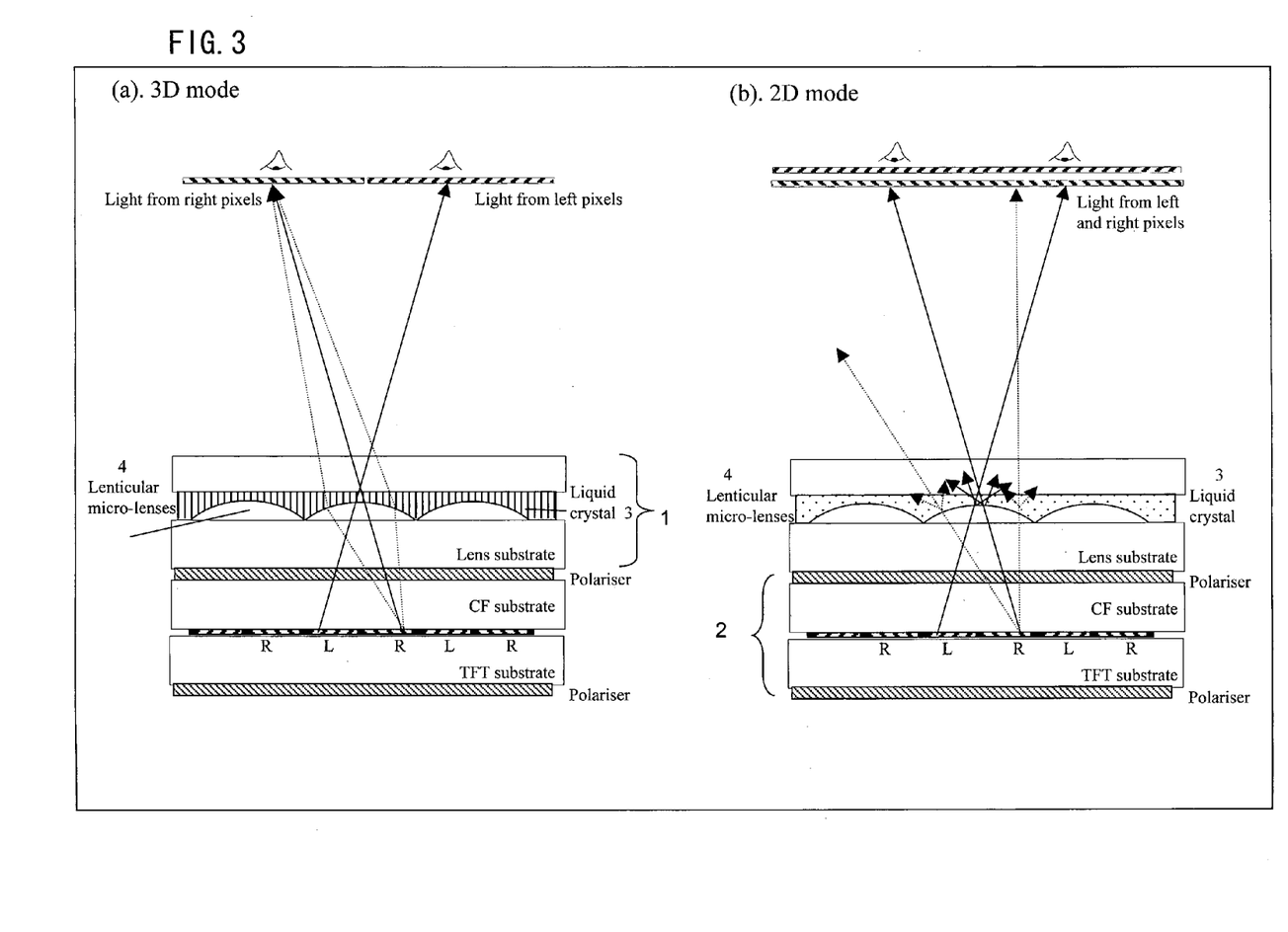
FIGS. 3(a) and 3(b) show the first embodiment of the invention.

This invention is about a new type of switchable lens design. The basis of the invention is shown in FIGS. 3(a) and 3(b). These show a display formed of a switchable optical component 1 disposed over an image display panel 2. FIG. 3(a) shows the display in a directional display mode (eg a 3-D display mode such as an autostereoscopic display mode) and FIG. 3(b) shows the display in a 2-D display mode.

An array of micro lenses is created which can be switched into a non-lensing mode in which the lensing effect of the lenses or microlenses is, as perceived by an observer, nullified, preferably completely, by the electro-optic layer or a lensing mode in which the lensing effect of the lenses or microlenses is substantially unaffected by the electro-optic layer. Indeed the overall effect in the non-lensing mode may be that the electro-optic layer and the lenses or microlenses combine to diverge light.

These lenses can be used, with an image display panel, to create eg. a switchable lenticular autostereoscopic display. In the lensing (3D mode) mode a lenticular autostereoscopic displays is created, in the non-lensing (2D mode) the display reverts to being a standard 2D display.

The key part of the design is that in 2D mode the lenses have a diffusing effect which helps to make the display uniform by removing any residual lensing effect.

There are many ways to create such a diffusing effect, examples of which are described in the embodiments of the invention.

Advantageous Effects of the Invention

The main advantage of the invention is that the 2D mode of the display is made especially uniform due to the diffusive action of the microlenses in their 2D mode. This is important because for main stream display acceptance 3D displays should have a 2D mode that is of equal quality to a conventional display.

Furthermore, in some embodiments the lenses may become easier to make because they can be made using lithography techniques rather than embossing techniques.

DESCRIPTION OF EMBODIMENTS

Embodiment 1

Embodiment 1 is described in the basic concept of the invention, and shown in FIGS. 3(a) and 3(b). This shows an optical component 1 having an array of microlenses 4. The microlenses are disposed on a substrate, and are planarised with an electro-optic layer, in this embodiment a LC layer 3. FIGS. 3(a) and 3(b) show the array of microlenses 4 being fully planarised by the LC layer 3—that is, the thickness of the liquid crystal layer is greater than (or equal to) the maximum thickness of the microlenses array—although in principle the invention could be effected with only partial planarisation of the microlenses (that is, with the thickness of the liquid crystal layer being less than the maximum thickness of the microlenses array). Electrodes (not shown) are positioned so that a voltage may be applied across the LC layer 3 to change its optical properties. The optical component 1 is positioned in the path of light from an image display panel 2.

The liquid crystal layer 3 is placed over the curved surfaces of the microlenses 4. The liquid crystal layer 3 may be placed directly against the curved surfaces of the microlenses, or there may be one or more components between the liquid crystal layer 3 and the curved surfaces of the microlenses (such as, for example an alignment layer). However, even if any components such as an alignment layer were disposed between the liquid crystal layer 3 and the curved surfaces of the microlenses, the thickness of such intervening component(s) is likely to be much less than the thickness of the lens array (for example may be 0.1% to 1% of the thickness of the lens array). As a result, the liquid crystal layer 3 and the array of microlenses 4 can be considered as lying in a common plane.

An optical component of the present invention has the advantage of reduced thickness, since additional substrates are not required between the array of microlenses 4 and the electro-optic layer. This makes an optical component of the present invention lighter and cheaper than conventional components. In addition, in the present invention there is no air gap between the array of microlenses and the upper substrate. In contrast, conventional components may have an air gap between the microlenses and a display substrate or between the microlenses and a diffuser substrate—and such air gaps are a disadvantage because water can condense within them, thereby degrading the performance of the component and any device in which the component is incorporated.

In a first mode of operation (FIG. 3(b)), the liquid crystal layer scatters the input light, creating a smoothly varying luminance function with respect to the incident angle from the display. Light passing through the component of FIG. 3(b) is scattered by the liquid crystal layer, whether the light is passing through the component along the normal axis of the component or whether the light is passing through the component at an oblique angle to the normal axis of the component. This first mode of operation can be used for the viewing non-autostereoscopic (2D) images. In a second mode of operation (FIG. 3(a)), the liquid crystal layer does not scatter the input light. The liquid crystal layer cooperates with the lenticular micro-lenses such that input light is directed to enable the viewing of autostereoscopic (3D) images—the liquid crystal layer has, in the second mode, a refractive index that is lower than the refractive index of the lens array, so that light is focused at the boundary between the micro-lenses and the liquid crystal layer. Both the first mode and second mode of operation change the light paths from the liquid crystal image display in a predetermined fashion. Switching between the first mode and second mode and/or the second mode to the first mode is achieved via the application of a suitable electric field to the liquid crystal. In the scattering mode of FIG. 3(a), the average refractive index of the liquid crystal layer is preferably equal to the refractive index of the lens array.

It can therefore been seen that the liquid crystal layer and the lens array combine, in the non-directional mode, to cause an optical effect (in this example, scattering) on light passing through the optical component. This effect will not however be apparent to a user, who will perceive the component to have a transmissivity that is independent, or substantially independent, of the viewing angle.

There are many liquid crystal modes that can be switched between a scattering state and a non-scattering state. For example, a Polymer Dispersed Liquid Crystal (PDLC), or a Smectic A phase in hydrodynamic instability or a cholesteric mode with focal conic texture. PDLCs consist of liquid crystal droplets that are dispersed in a solid polymer matrix. These tiny droplets (a few microns across for practical applications) are responsible for the unique behavior of the material. By changing the orientation of the liquid crystal molecules with an electric field, it is possible to switch from a scattering state (2D mode) to a non-scattering state (3D mode). Polymer-dispersed liquid crystals can be prepared in several different ways including: encapsulation (emulsification) and phase separation; the latter process has become the primary method of manufacture. Each method produces PDLCs with different properties and characteristics. Among the factors influencing the properties of the PDLC material are the size and morphology (shape) of the droplets, the types of polymer and liquid crystal used, and cooling and heating rates in production. In order to obtain PDLCs by phase separation, a homogeneous mixture of polymer, for example Norland Optical Adhesive NOA 65, (or prepolymer) and liquid crystal, for example E7, is first produced. The liquid crystal droplets are then formed by the separation of the two phases. The polymer and liquid crystal are chosen so that the refractive index of the polymer matches the ordinary refractive index of the LC to enable a non-scattering mode (with the refractive index of the polymer and the ordinary refractive index of the LC being lower than the refractive index of the lens array). The resulting polymer and LC mixture is then injected into the cavity surrounding the pre-formed lens shape.

The micro lenses can be made in many ways, for example by embossing or by photolithography ('Microlens Arrays', Dan Daly, Taylor & Francis). The electrodes may be made from a transparent material such as indium tin oxide (ITO) and be positioned on the lenses or under the lenses. Typically voltage would be applied perpendicular to the plane of the lens substrate.

As for all the embodiments in this patent there are different configurations that could be used. The lenses may be faced with their curved surface towards the pixel or towards the viewer. Additionally, there may be some temperature dependence of the LC performance and temperature. This could be compensated by adjusting the voltages applied to the LC. The shape of the lenses may be aspherical, for example they may have the shape of the lenses disclosed in UK patent application 0916398.1.

Embodiment 2

Figure 4:
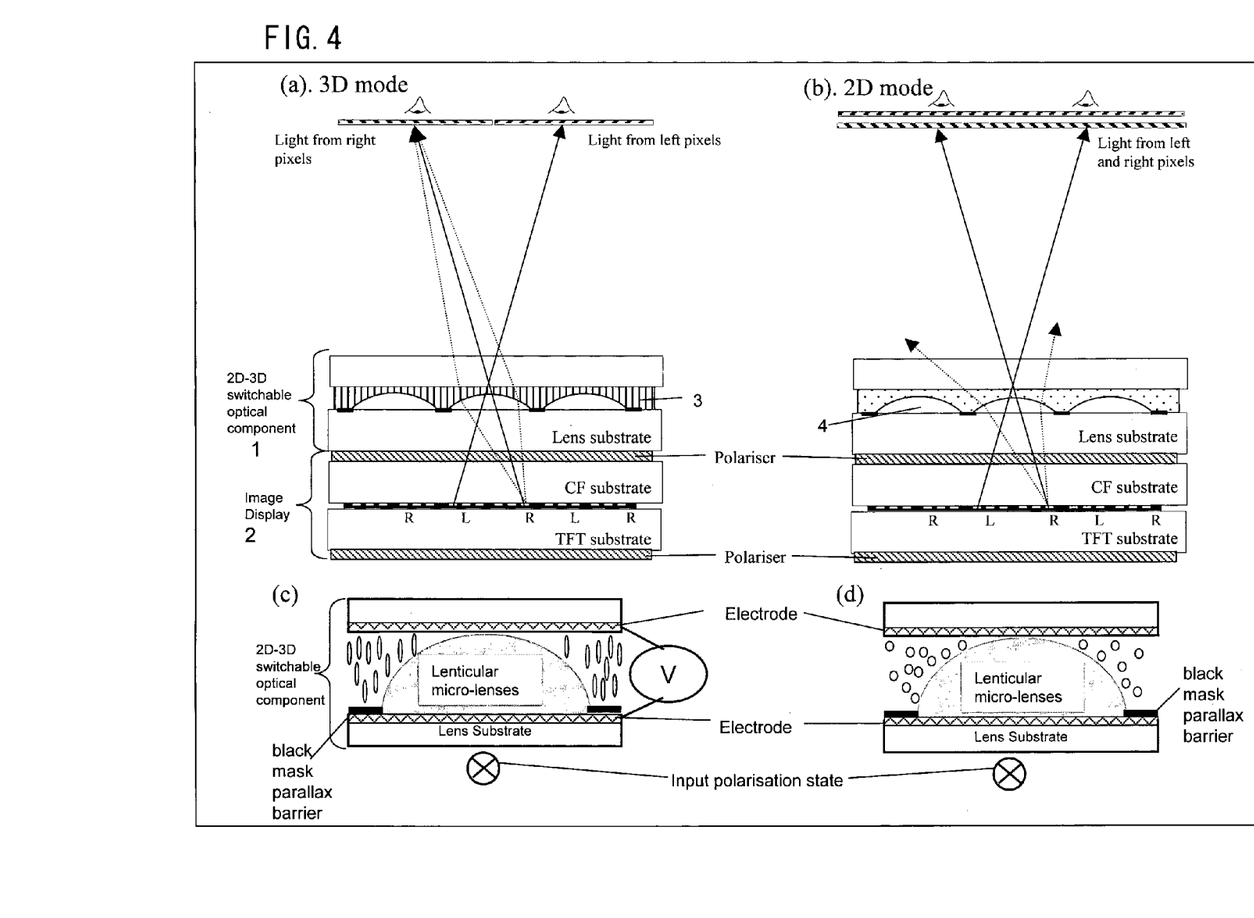
FIGS. 4(a) and 4(b) show an equally useful alternative embodiment of the invention.
FIGS. 4(c) and 4(d) are partial enlarged views of FIGS. 4(a) and 4(b).

A diagram of embodiment 2 is sketched in FIGS. 4(a) and 4(b). These again show a display formed of a switchable optical component 1 disposed over an image display panel 2.

The optical component 1 again has an array of microlenses 4, whose curved surfaces are at least partially planarised in with an electro-optic layer, in this example a LC layer 3 (FIGS. 4(a) and 4(b) show the LC layer 3 fully planarising the microlenses 4). Electrodes are positioned so that a voltage may be applied across the LC layer 3 to change its optical properties, as shown in the enlarged partial views of FIGS. 4(c) and 4(d).

The liquid crystal layer 3 is placed over the curved surfaces of the microlenses 4. The liquid crystal layer 3 may be placed directly against the curved surfaces of the microlenses, or there may be one or more components between the liquid crystal layer 3 and the curved surfaces of the microlenses (such as, for example an alignment layer and/or an electrode layer). However, even if components such as an alignment layer or electrode layer are disposed between the liquid crystal layer 3 and the curved surfaces of the microlenses, the thickness of such intervening component(s) is likely to be much less than the thickness of the lens array (for example may be 0.1% to 1% of the thickness of the lens array). As a result, the liquid crystal layer 3 and the array of microlenses 4 can be considered as lying in a common plane.

FIG. 4(a) shows the display in a directional display mode (eg a 3-D display mode such as an autostereoscopic display mode) and the 2D mode is illustrated by FIG. 4(b). The 2D-3D switchable optical component comprised of a microlens array, parallax barrier array, liquid crystal material and respective substrates. The 2D-3D switchable optical component 1 is illustrated to show the molecular orientation of the liquid crystal material in order to achieve switching between the 2D mode and the 3D mode. The combination of this switchable optical component with an image display (comprised of TFT substrate, pixels, colour filter substrate and polarizers) is also illustrated.

The micro lenses of the 2D-3D switchable optical component may be created using lithography. A substrate with a conductive electrode (such as Indium Tin Oxide) is coated with photo resist. The photo resist patterned and made into pillars by lithography, and these pillars are reflowed to create lens shapes ('Microlens Arrays', Dan Daly, Taylor & Francis). The lenses are separated from each other by a small gap to prevent the lenses from touching each other during the reflow process and merging together. It is beneficial to add a patterned black mask (parallax barrier) between the lenses to prevent light passing between the lenses. This is important so that light does not pass between the lenses in the 3D mode without being appropriately deflected by the lenses. If the black mask was not added then light passing between the lenses would lead to light from the left pixel going to the right eye window, and vice versa. This is called crosstalk and it detracts from the quality of the display. The black mask has the unwanted side effect of reducing 2D uniformity, even if the lensing action of the lenses is completely removed.

The lens and parallax barrier substrate is then over-coated with an alignment layer, such as PVA (not shown in FIG. 4(a) or 4(b)). The lens and parallax barrier substrate is then rubbed to induce uniform liquid crystal alignment in a direction such that the long molecular axis of the liquid crystal material aligns parallel to the direction of the lens (into the plane of the page as illustrated in FIG. 4(b)). A $2^{nd}$ counter substrate with electrode and an over coating of rubbed alignment layer is adhered to the lens and parallax barrier substrate such that the alignment directions of these two substrates are anti-parallel with respect to each other. A suitable liquid crystal material is then injected into the resulting optical component and the liquid crystal material fills the voids created between the lens and parallax barrier substrate and the counter substrate. The resulting 2D-3D switchable optical component is then adhered to an image display. The polarization state of light output from the image display is arranged to be linearly polarized with the electric filed vector parallel to the liquid crystal alignment direction of the 2D-3D switchable optical component, as illustrated in FIG. 4(b). Arranging the polarization state output from the image display in such a fashion may require the use of an optical film, such as a half-wave plate.

In the 3D mode, the lenses must focus light from the pixels and so a voltage is applied to the liquid crystal to reorient the liquid crystal molecules and effectively change the refractive index so that it is lower than that of the lenses, and light is focused. The lenses act as convex lenses. As illustrated in FIG. 4(a) an applied voltage reorients the liquid crystal molecules to a vertical orientation.

In the 2D mode, the light must not be focused by the lenses to create a 3D effect. In addition, the black mask regions between the lenses will act as a parallax barrier and cause some directional effect and this is undesirable since the black mask regions should ideally not cause non uniformity of the display brightness with angle. Conventionally this might be achieved by applying a particular voltage to the liquid crystal such that its refractive index matches the lenses and there is no light directing action from the lenses. This would have the effect of removing the lensing action of the lenses, but, as stated above, this can in practice be difficult to achieve exactly especially if the operating temperature can vary. Moreover, it would not remove angular brightness non uniformity caused by the black mask between the lenses.

In this embodiment a different method is used to create a 2D mode. A known voltage is applied to the liquid crystal such that its refractive index becomes slightly higher than that of the lenses. Therefore light is diverged at the boundary between the lenses and the liquid crystal layer, and the lenses spread light from the pixels compensating for the non uniformity caused by the black mask, without causing any 3D effect. The lenses in this case act as concave lenses. In this embodiment, therefore, the liquid crystal layer and the lens array again combine, in the non-directional mode, to cause an optical effect (in this example, divergence) on light passing through the optical component. Light passing through the component of FIG. 4(b) is diverged at the interface between the liquid crystal layer and the lens array, whether the light is passing through the component along the normal axis of the component or whether the light is passing through the component at an oblique angle to the normal axis of the component. This effect will not however be apparent to a user, who will perceive the component to have a transmissivity that is independent, or substantially independent, of the viewing angle.

The known voltage may be 0 Volts.

An example of a 2D-3D switchable optical component is comprised of a lens that has a radius of curvature of ~145 μm (lens height ~40 μm), a lens width of ~197μm and the lens material has a refractive index of 1.57. The black mask that forms the parallax barrier between the lens elements has a width of ~10 μm. A liquid crystal mixture is used such that the extra-ordinary index of refraction is 1.584 (slightly higher than that of the lens) and an ordinary index of refraction of 1.48. The lens and barrier layer of the 2D-3D switchable optical component is arranged to be ~950 μm from the image display pixel layer. The pitch of a left and right pixel groups of the image display layer is approximately the same as the pitch of the lens and parallax barrier optic.

In addition, the LC may be a scattering LC similar to that of embodiment 1. In this case the LC index would be controlled as above and in addition the LC would become scattering in the 2D mode.

As for all the embodiments in this patent there are different configurations of electric field that could be used. For example the electrodes could be positioned under the resist lenses or on top of the resist lenses, or the electrodes could be constructed so as to apply a field in the plane of the liquid crystal.

Embodiment 3

Figure 5:
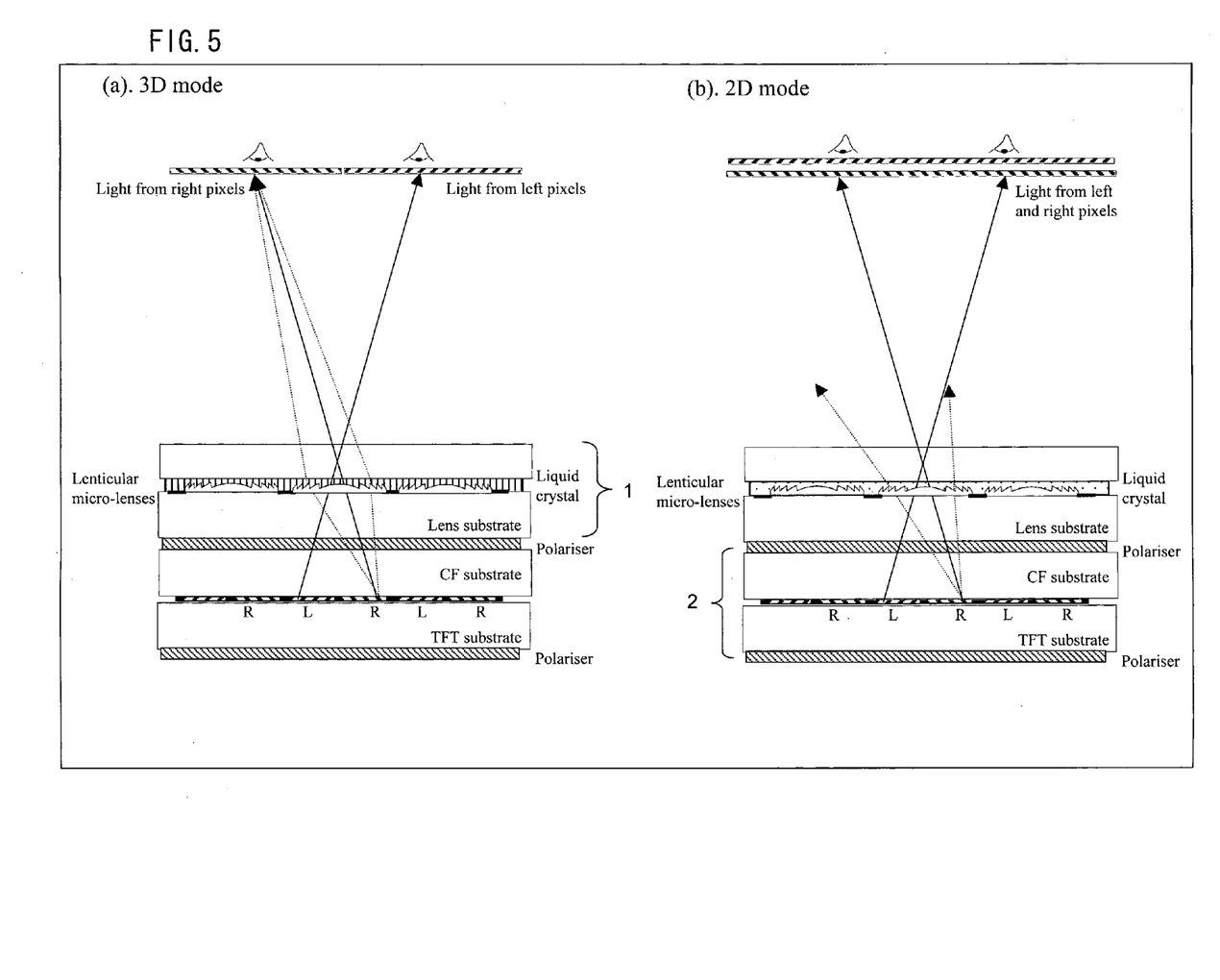
FIG. 5 shows an embodiment where the lenses are Fresnel lenses.

In a further embodiment the shape of the lens may be a Fresnel lens, as shown in FIG. 5. The main advantages of this are that the LC cell can be thinner, so less LC (or other electro-optical material) is needed to reduce cost, and the LC may switch between 2D and 3D modes faster. This embodiment may be combined with any one of the embodiments previously described herein—that is, the lens of any previous embodiment may be embodied as a Fresnel lens Although certain preferred embodiments of the invention have been described above, the invention is not limited to the described embodiments and other variations are possible.

As an example, in the embodiments described above the lenses are embossed in a plastics sheet, but the invention is not limited to this. The directional effect of a black mask in a nominally non-directional mode described with reference to FIGS. 4a and 4b will occur in other switchable components, and the invention may for example be applied to other components to eliminate the directional effect of a black mask. Indeed the invention may be applied in a switchable component having a reconfigurable lens array (such as an electro-wetting lens array) in which the shape of the lenses is altered to switch between a directional node and a non-directional mode. Moreover, although the embodiment of FIGS. 3(a) and 3(b), is described with reference to a lens array that is not provided with a black mask, this embodiment may be applied to a lens array that is provided with a black mask; conversely, the embodiment of FIGS. 4(a) and 4(b) may be applied to a lens array that is not provided with a black mask.

In the non-directional mode, the electro-optic layer may be in a scattering mode. The electro-optic layer scatters light that has passed through the lens array, and this scattering leads to a non-directional display mode. To put the optical component in a directional mode the electro-optic layer is put in a non-scattering state so that the lens array produces an optical effect (eg focusing), and that the optical effect produced by the lens array is not significantly affected by passage of light through the electro-optic layer.

Alternatively, in the non-directional mode, the electro-optic layer may diverge light passing through it. Again, if the electro-optic layer diverges light that has passed through the lens array, this will nullify the optical effect (eg focusing) produced by the lens array and so lead to a 2-D display mode.

In the non-directional mode, the electro-optic layer may have a refractive index that is greater than the refractive index of the lens array. Since the refractive index of the electro-optic layer is required only to be greater than the refractive index of the lens array, it is straightforward to achieve this over a typical range of working temperatures, and this invention is therefore much easier to implement than U.S. Pat. No. 6,069,650.

The electro-optic layer may be a liquid crystal layer.

The liquid crystal layer may comprise a liquid crystal material disposed in a host material. It may comprise a polymer-dispersed liquid crystal material.

The liquid crystal layer may comprise a cholesteric liquid crystal material.

The optical effect may be focusing.

The lens array may be an array of Fresnel lenses.

In the non-directional mode, the transmissivity of the optical component may be substantially independent of the viewing angle. This provides a mode that is completely, or almost completely, non-directional.

The display may be arranged to provide a 3-D display mode when the switchable optical component is in the directional mode, for example an autostereoscopic 3-D display mode.

Alternatively, the may be arranged to provide a multiple view display mode when the switchable optical component is in the directional mode.

Another aspect of the invention provides an optical component switchable between a directional mode and a substantially non-directional mode, the optical component comprising a lens array and an electro-optic layer disposed in the path of light through the lens array, wherein the electro-optic layer is disposed in substantially the same plane as the lens array; and wherein in the non-directional mode the lens array and the electro-optic layer act such that the optical component has an optical effect on light passing through the component, for example along its normal axis or along another axis different from the normal axis.

Another aspect of the invention provides an optical component switchable between a directional mode and a substantially non-directional mode, the optical component comprising a lens array and an electro-optic layer disposed in the path of light through the lens array, wherein the electro-optic layer is disposed in contact with a surface of the lens array; and wherein in the non-directional mode the lens array and the electro-optic layer act such that the optical component has an optical effect on light passing through the component, for example along its normal axis or along another axis different from the normal axis.

The invention claimed is:

1. A display system comprising:
    only one image display panel that emits light of an image to be outputted by the display system in both a directional mode and a substantially non-directional mode; and
    an optical component disposed on a viewing side of the image display panel in a path of light through the image display panel;
    wherein the optical component is switchable between the directional mode and the substantially non-directional mode, the optical component comprising a lens array and an electro-optic layer disposed in the path of light through the lens array, wherein the electro-optic layer is disposed over a surface of the lens array in a direction of light travel and planarises the surface of the lens array; and wherein in the non-directional mode the lens array and the electro-optic layer act such that the optical component has an optical effect to scatter or diverge light passing through the component emitted from the image display panel.

2. The display system as claimed in claim 1 wherein, in the non-directional mode, the electro-optic layer is in a scattering mode.

3. The display system as claimed in claim 1 wherein, in the non-directional mode, the electro-optic layer diverges light passing through it.

4. The display system as claimed in claim 1 wherein, in the non-directional mode, the electro-optic layer has a refractive index that is greater than the refractive index of the lens array.

5. The display system as claimed in claim 1 wherein the electro-optic layer is a liquid crystal layer.

6. The display system as claimed in claim 5 wherein the liquid crystal layer comprises a liquid crystal material disposed in a host material.

7. The display system as claimed in claim 5 wherein the liquid crystal layer comprises a polymer-dispersed liquid crystal material.

8. The display system in claim 5 wherein the liquid crystal layer comprises a cholesteric liquid crystal material.

9. The display system as claimed in claim 1 wherein in the directional mode the optical component has an optical effect of focusing.

10. The display system as claimed in claim 1 wherein the lens array is an array of Fresnel lenses.

11. The display system as claimed in claim 1 wherein, in the non-directional mode, the transmissivity of the optical component is substantially independent of the viewing angle.

12. The display system according to claim 1 and arranged to provide a 3-D display mode when the switchable optical component is in the directional mode.

13. The display system according to claim 12 and arranged to provide an autostereoscopic 3-D display mode when the switchable optical component is in the directional mode.

14. The display system according to claim 1 and arranged to provide a multiple view display mode when the switchable optical component is in the directional mode.

15. The display system according to claim 1, wherein the optical component further comprises a black mask parallax barrier, with barrier elements of the black mask parallax barrier being disposed between adjacent lens elements of the lens array so as to space apart adjacent lens element of the lens array.

* * * * *